April 16, 1963 SHINICHI KAWAGUCHI 3,085,526
STITCH PATTERN CONTROL MEANS FOR ZIGZAG SEWING MACHINE
Filed Oct. 5, 1960 7 Sheets-Sheet 1

INVENTOR.
SHINICHI KAWAGUCHI.
BY
Ward, Neal, Haselton, Orme & McElhannon
ATTORNEYS.

April 16, 1963 SHINICHI KAWAGUCHI 3,085,526
STITCH PATTERN CONTROL MEANS FOR ZIGZAG SEWING MACHINE
Filed Oct. 5, 1960 7 Sheets-Sheet 2

INVENTOR.
SHINICHI KAWAGUCHI.
BY
Ward, Neal, Haselton, Orme & McElhannon
ATTORNEYS.

April 16, 1963  SHINICHI KAWAGUCHI  3,085,526
STITCH PATTERN CONTROL MEANS FOR ZIGZAG SEWING MACHINE
Filed Oct. 5, 1960  7 Sheets-Sheet 4

INVENTOR.
SHINICHI KAWAGUCHI.
BY
Ward, Neal, Haselton, Orme & McElhannon
ATTORNEYS.

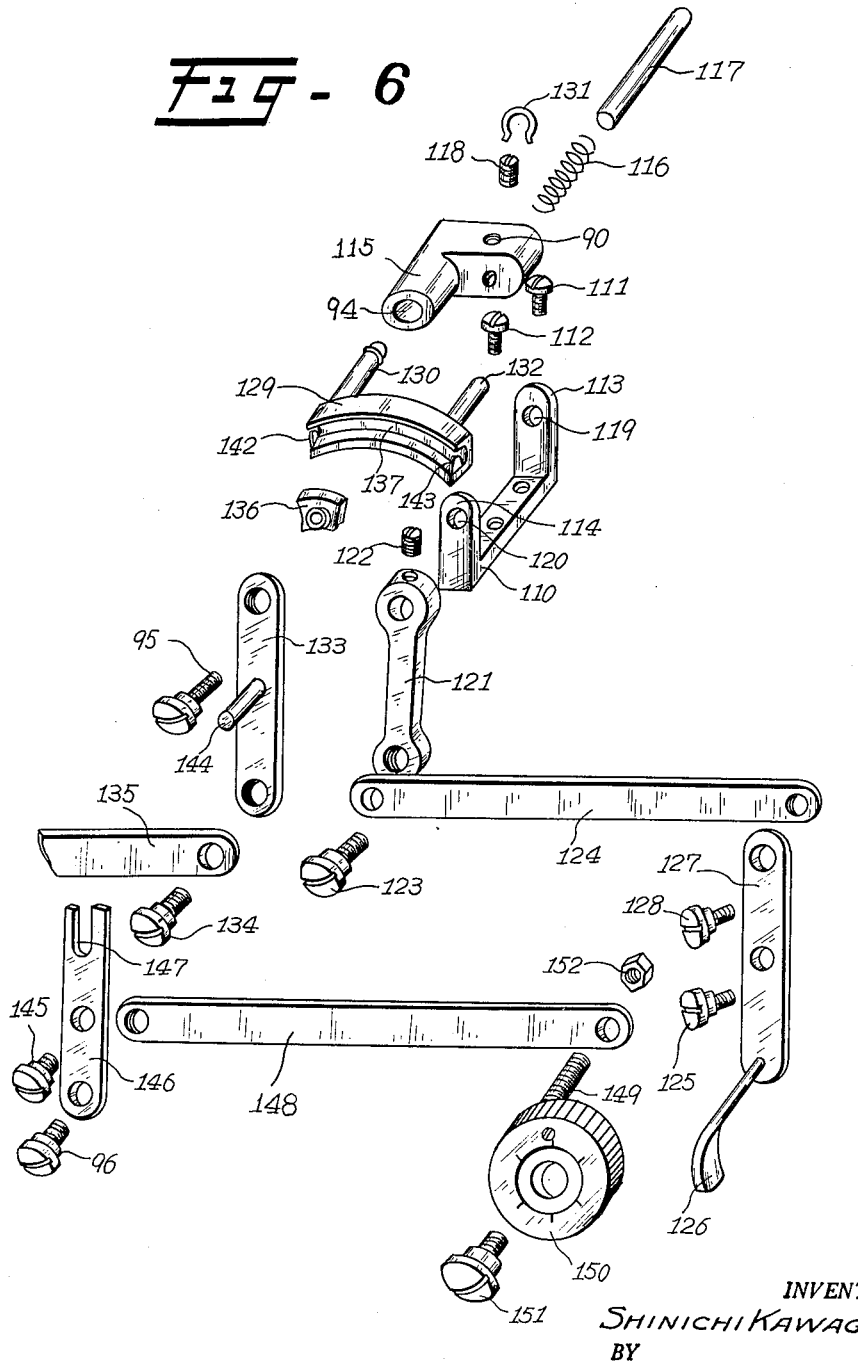

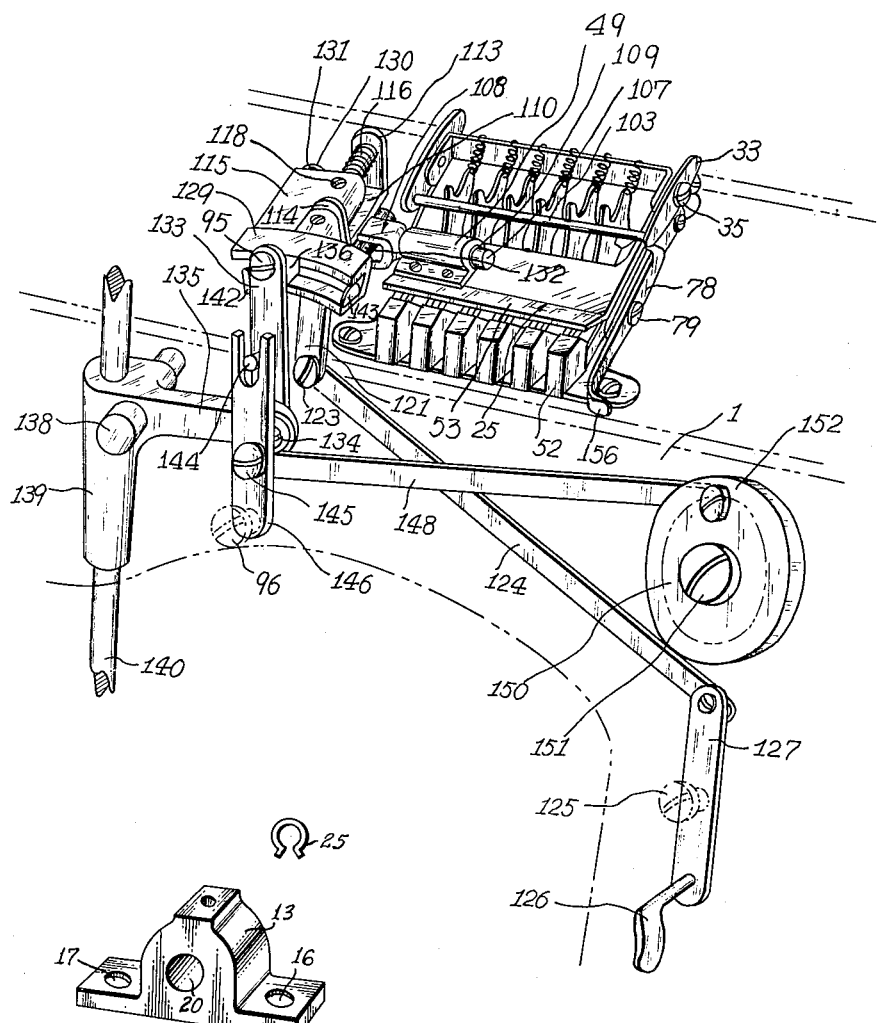
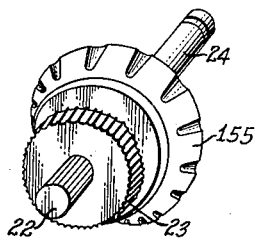

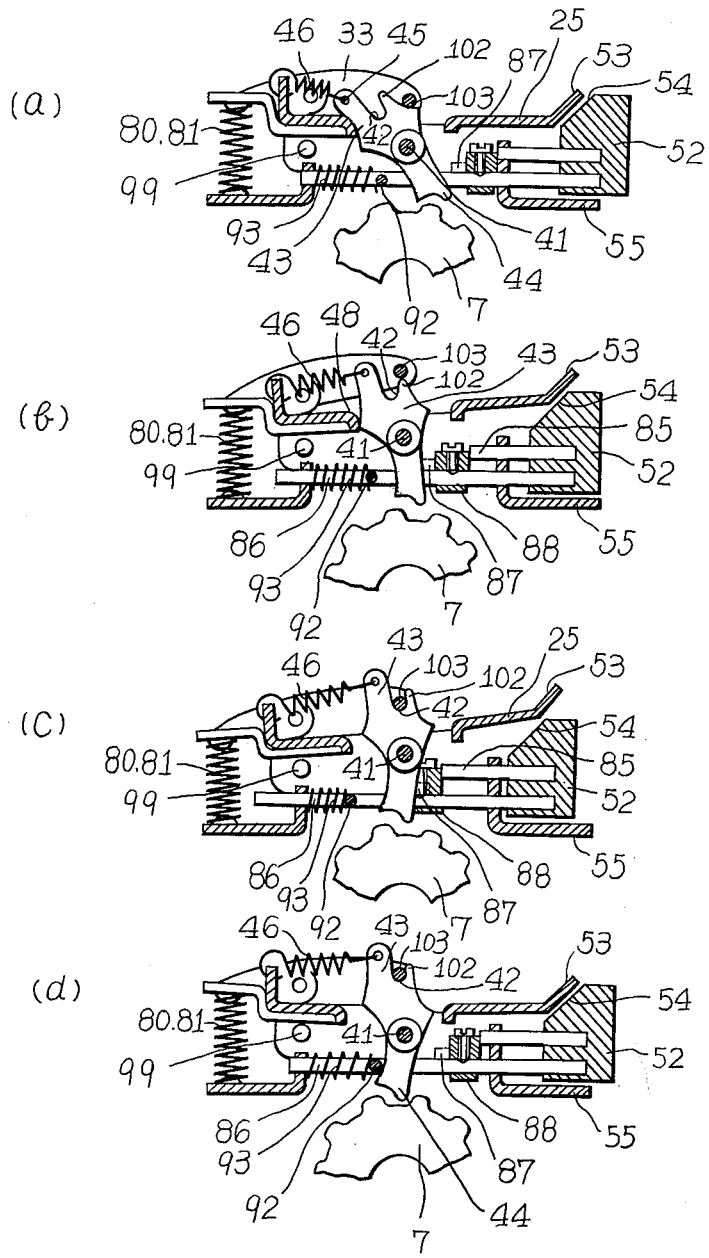

United States Patent Office 3,085,526
Patented Apr. 16, 1963

3,085,526
STITCH PATTERN CONTROL MEANS FOR
ZIGZAG SEWING MACHINE
Shinichi Kawaguchi, Tokyo, Japan, assignor to Riccar
Sewing Machine Co., Ltd., Tokyo, Japan, a corporation
of Japan
Filed Oct. 5, 1960, Ser. No. 60,731
Claims priority, application Japan Jan. 19, 1960
11 Claims. (Cl. 112—158)

This invention relates to means for determining the stitch pattern which is produced by the needle of sewing machine, comprising a cam selecting mechanism for selecting cam combinations to effect various stitch patterns to be produced by the machine by manually operating either a single button or several buttons simultaneously, without stopping the motion of the machine during a sewing operation. Morever, the invention includes means for varying the sweep amplitude of the pattern selected, and for shifting the location of the pattern on the workpiece either of which will further modify the overall pattern and thereby add to the number of pattern combinations made available by the machine.

According to one device in the prior art, said function is achieved by mechanical rocking motion of a link mechanism connected to the needle bar of the machine. The rocking motion is imparted by a rotating cam, and a shiftable change-over feeler (contacting member) is provided for engaging and disengaging the cam.

Several such cams may be provided so that another separate and distinct stitch pattern may be selectively produced upon shifting the feeler to another cam. However, every time that the feeler is shifted to a different cam, the operation involves stopping the machine. Consequently, the stitch pattern-changing operation is troublesome and time wasting, and the change of stitch patterns available is limited by the number of cams in the machine.

According to another device in the prior art, a cam receiving portion is provided to receive a single cam which is engaged by a fixed feeler in the machine. By changing the cam for another, a different stitch pattern may be thereby produced. In this case also the machine is stopped to change the cam and the stitch pattern is limited to that provided by the cam.

There have been proposed cam-selecting mechanisms capable of obtaining sequentially different stitch patterns without stopping the machine, but the proposals incorporate disadvantages which make them unsatisfactory.

The object of this invention is to eliminate various disadvantages existing in the above proposals of the prior art and to provide a novel cam-selecting mechanism of simple construction whereby optional selection of any stitching pattern may be made even when the machine is in motion.

The above object may be attained, in zigzag sewing machine provided with a control mechanism for effecting various kinds of stitch patterns, by providing suitable numbers of cams and a vibrator element having corresponding numbers of spiders thereon for transmitting the mechanical pattern-controlling impulse from the cams to the needle bar of the machine, and a selecting change-over member for selectively engaging and disengaging the spiders and the cams.

With these and other objects in mind, reference is had to the attached sheets of drawings illustrating one practical embodiment of the invention and in which:

FIG. 6 is a detailed exploded view of a rocking box assembly and a stitch width adjusting device.

FIG. 7 is a perspective and explanatory view of a needle bar rocking mechanism.

FIG. 8 is a detailed exploded view of an intermediate gear base block.

Figure 1:
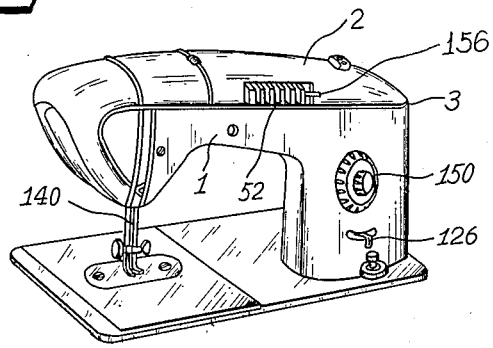
FIG. 1 is a perspective view of the sewing machine provided with the cam selecting mechanism of the invention.
Figure 2:
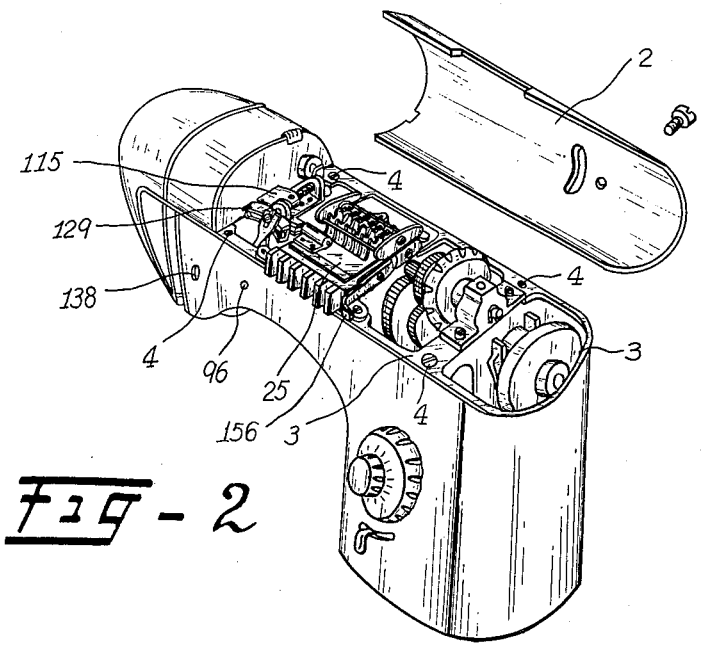
FIG. 2 is a perspective fragmentary view of the sewing machine shown in FIG. 1, wherein the cover has been removed.

FIGS. 9 (a), (b), (c) and (d) are sectional and explanatory drawings to show operative motions caused by a push button.

In the drawings, 1 is an arm of the sewing machine, and 2 is a detachable cover mounted on said arm. The cam-selecting mechanism of the invention is disposed in the upper portion within said arm and below said cover.

3 is a supporting plate provided with suitable numbers of holes 5 for inserting set screw 4 to attach the supporting plate to the arm 1, the screws being screwed into corresponding numbers of screw holes 6 therein.

7 is a group comprising a plurality of cams, at one end of which a gear 21 is provided. The cams 7 are attached on a rotatable upper shaft 10 which is mounted between a front bearing 8 and a rear bearing 9 provided on said arm 1. One end of said group is restrained against axial movement on shaft 10 by a set collar 11 and the other end thereof is similarly restrained by the gear 21, both of which are also attached to said upper shaft. Another gear 12 is mounted to freely rotate on the shaft 10, as shown.

Figure 4:
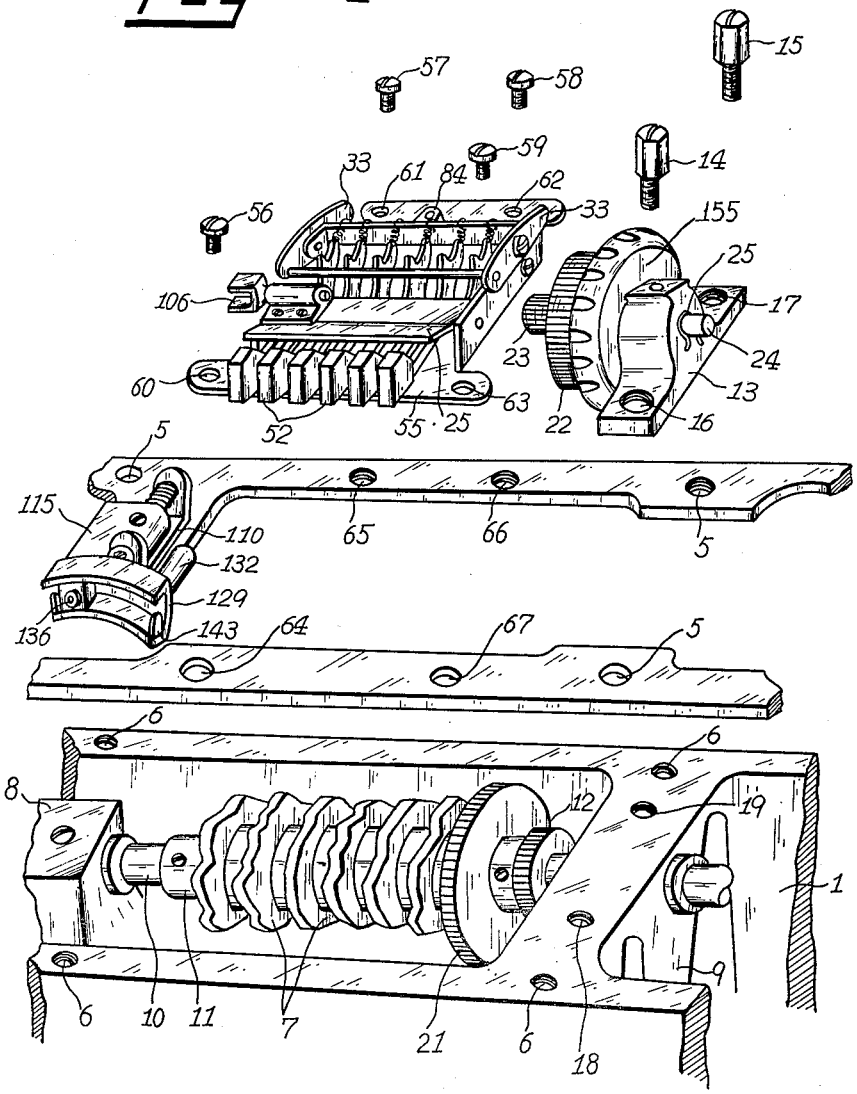
FIG. 4 is an exploded view showing a vibrator assembly, a supporting plate and a group of cams.

13 is a base block for intermediate gears, having holes 16, 17 for inserting set screw 14, 15 in screw holes 18, 19 in said arm 1 (FIG. 4.)

Figure 3:
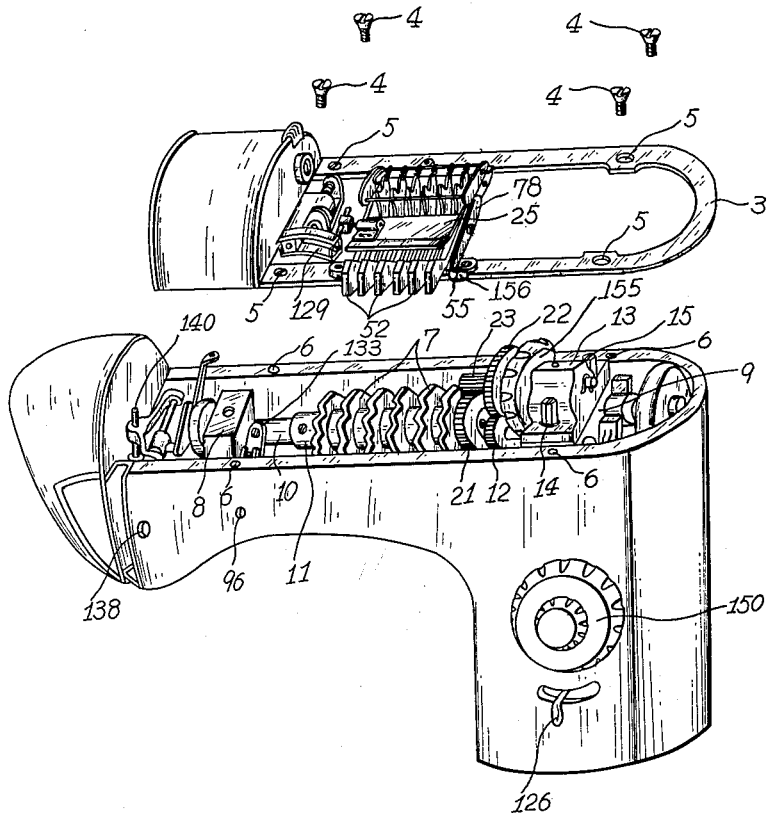
FIG. 3 is a perspective view of the sewing machine fragment shown in FIG. 2, wherein the supporting plate has been removed.

As shown in FIG. 8, bearing 20 is mounted within said base block 13 to receive shaft 24. Intermediate gears 22, 23 and a flywheel 155 are attached to said upper shaft 24. The arrangement is such that said gear 12, which is mounted on the upper shaft 10, and said gear 22, as well as said gear 23 and said gear 21 will engage respectively so that when the gear 12 is rotated by motor drive means of the machine (not shown), the shaft 10 will be rotated by the interconnected gear chain, as shown in FIG. 3.

Said shaft 24 passes rotatably through said bearing 20 of the base block 13 and its end portion is restrained by a set collar 25 to prevent it from slipping out of its position. (FIG. 4.)

Figure 5:
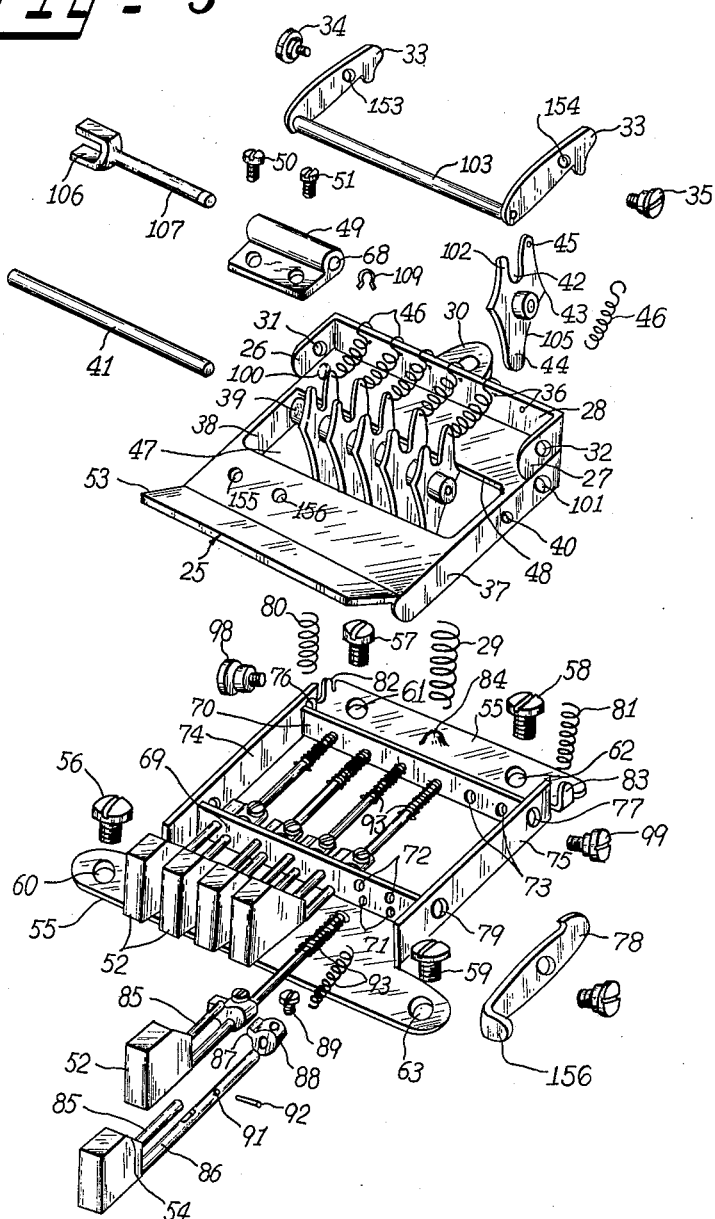
FIG. 5 is a detailed exploded view of the base block for push buttons in the vibrator assembly.

25 is a vibrator, as shown in FIG. 5, provided with a side edge projection 28 which is projecting upwardly, having support projections 26, 27 on both ends thereof, and a support portion 30 for a compression spring 29 behind said side edge projection.

To screw holes 31, 32, which are formed in said support projections 26, 27, a snap lever 33 is pivotally attached by means of set screw 34, 35 which also pass through holes 153, 154 in the snap lever. Within said side edge projection 28, there are provided a suitable number of spring hooking holes 36 for attaching tension springs 46 which extend between edge projection 28 and holes 45 in spider 43, as shown. The spiders 43 are rotatably mounted on a spider shaft 41, which passes through bearings 39, 40 in downwardly projecting end edge projections 37, 38, respectively, and extend downwardly into engagement with the cams 7, as indicated in FIG. 4. As shown in FIG. 5, each spider 43 has a locking recess 42 at its upper end for engaging locking bar 103 on snap lever 33 when in a locked position, as will be described, and a contact fin 44 at its lower end for engaging one of the cams 7 at proper times, as also will be described.

Each spider 43 is disposed so as to move operatively within a rectangular aperture 47, which is formed at the central portion of said vibrator 25. Each spider is urged by tension spring 46 towards a side edge 48 of said rectangular aperture 47, against which it will normally rest, so that its contact fin 44 is out of engagement with its associated cam 7.

On the upper portion of said vibrator 25, a bearing member 49 is attached, as by means of screws 50, 51, and on the side of said vibrator 25 towards push buttons 52, a side edge projection 53 of slant shape is provided. Push buttons 52 have correspondingly slanted portions 54 so that upon operating the push buttons, these portions 54 will engage and easily push up said vibrator 25, as shown by FIG. 9.

55 is a base block for the push buttons 52. Holes 60, 61, 62 and 63 are formed therein for inserting set screw 56, 57, 58 and 59 to attach the base block 55 to said supporting plate 3 at corresponding screw holes 64, 65, 66 and 67 formed in said supporting plate 3. In turn, the supporting plate 3 is attached to said arm 1 by means of set screws 4, as previously described.

On said base block 55 for push buttons, there are provided side edge portions 69, 70, which project upwardly. For supporting said push buttons 52, a suitable number of pushing rod holes 71 and adjacent guide rod holes 72 are disposed above and below each other in edge portions 69, and a suitable number of pushing rod holes 73 are provided in edge portion 70.

On end edge portions 74, 75, which project upwardly on the base block 55, there are provided holes 76, 77 for attachment of the vibrator 25 and a set screw hole 79 for attachment of a standard stitch resuming lever 78. At the side of base block 55 opposite push buttons 52, there are provided supporting portions 82, 83 for supporting compression spring 80, 81 of said snap lever 33, and a supporting portion 84 for supporting compression spring 29 which acts on said vibrator 25, as will be described.

On each push button 52 a guide rod 85 and a pushing rod 86 are provided for maintaining the upright position of said push button 52 and for guiding its movement. The guide rod 85 is inserted through the pushing rod holes 71, 73, as indicated in FIG. 5.

On the pushing rod 86 of each push button 52, and in the area between said side edge projections 69, 70, an acting member 88 having a projection 87 is attached in a fixed position, as by a screw 89. As will be seen (FIG. 9), its position is such that when said push button is pushed, said projection 87 acts on the edge of contact fin 44 of its associated spider 43 so that the spider 43 will rotate on the spider shaft 41.

A push spring 93 is disposed around each pushing rod 86 to bias its associated push button 52 outwardly, away from edge portion 70, the spring 93 being held in position by a pin 92 which is inserted in a pin hole 91 of the pushing rod. One end of said pin 92 extends so that it will engage the fin 44 of its associated spider 43, as will be understood by reference to FIG. 9.

End edge projection 37, 38, which project from the underside of vibrator 25, are pivotally attached to the corresponding end portions 74, 75, which project upwardly from the base block 55. The attachment is effected by set screws 98, 99 which are inserted through holes 76, 77 in the base block and through corresponding holes 100, 101 in the vibrator.

Referring to FIG. 9, when the projection 87 of acting member 88 acts on the fin 44 of its associated spider 43 upon operation of the push button 52, a nose shaped projection 102, which forms one side of the locking recess 42 thereof, pushes up a locking bar 103, which forms a part of the snap lever 33, causing the latter to drop into the recess 42. When so engaged by locking bar 103, the spider 43 is in its locked position whereat the pointed end of contact fin 44 is in contact engagement with its associated rotating cam 7. The locking action is effected by the upward bias of springs 80, 81, as will be understood by reference to FIG. 9, and the cam rotation will impart a vertically vibrating motion to the vibrator 25, through the shaft 41 to which the spiders 43 are attached, by the cam follower action of the spider. The configuration of any cam 7 will determine the amplitude and, depending upon its speed of rotation, the frequency of the vibration thereby afforded. It therefore becomes apparent that, as determined by different configurations of all of the cam 7, where more than one cam is so engaged, the vibratory movement of the vibrator 25 will be varied both in amplitude and frequency, and sporadically, during any cycle of revolution of the shaft 10. A repetitive pattern of vibration of vibrator 25 is thereby established which may be transmitted to the needle bar of the machine as will be seen, and which is subject to variation in any desired manner within the range of the available cam combinations provided.

The surface 105, where the fin 44 of said spider 43 engages the pin 92 attached to said pushing rod 86, is formed in arc shape, its surface generated by a radius emanating, when the spider 43 is in locking position (FIG. 9d), from the central axis passing through said set screw 98, 99 supporting said base block 55 and vibrator 25. When the vibrator 25 rotates with respect to the base block 55, on the set screws 98, 99 in response to generally vertical movement of the spider 43 imparted by rotation of the cam 7, the surface 105 will ride on the pin 92, yet not act upon it to cause in and out movement of the push button 52. Thus, as illustrated by FIG. 9a–9d, upon inward movement of the push button 52, at first the vibrator 25 is pushed up by action of the tapered push button surface 54 on correspondingly tapered projection 53 of vibrator 25; then the projection 87 of the acting member 88 which is attached to the pushing rod 86 acts on the fin 44 of said spider 43 whereupon the locking recess 42 of said spider 43 engages the locking bar 103 and said pin 92 engages the arc shaped surface 105 of said fin 44. The push button 52 will sink from its unoperated position and yet the slant portion 54 will not then be in contact with the slant side edge projection 53 of said vibrator 25, whereupon the spider 43 is locked into association with the cam 7.

Referring now to FIGS. 5–7, the bearing member 49, which is attached to the vibrator 25, has a bearing hole 68 in which the shaft portion 107 of a universal coupling 108 resides.

The shaft portion 107 is rotatable within hole 68, and its end portion is set by a set collar 109 to prevent its slipping out of its position. At its other end, the shaft portion 107 has a fork portion 106 which forms a part of the universal coupling 108.

In FIG. 6, 110 is a shaft supporting block which is fixed by set screws 111, 112 to the supporting plate 3. Between bearing openings 119, 120 of side edge projections 113, 114 thereof, which project upwardly, a box receiving member 115 is supported by a shaft 117. A spring 116, on shaft 117, exerts pressure between the side edge of the box receiving member 115, which is fixed on shaft 117 by means of a screw 118 through a screw hole 90 therein, and the projection 113 of the shaft supporting block 110 for a purpose to be described. Said shaft 117 is rotatable in the bearings 119, 120 of said side edge projection 113, 114 and one end thereof is elongated for attachment of a stitching position restricting single armed lever 121 by means of a screw 122 as indicated in FIG. 6.

The other end portion of said stitching position restricting single armed lever 121 is pivotally attached to one end of a tension rod 124 by means of a screw 123, the opposite end of said tension rod 124 being pivotally connected to a double armed lever 127 of the stitching position adjusting device. A grip 126 is provided by which the double armed lever 127 may be pivoted with respect to the arm 1, the lever 127 being pivotally attached thereto by screw 125, as shown in FIG. 7.

Referring to FIG. 6, a supporting shaft 130 of a rocking box 129 is rotatably mounted within the bearing portion 94 of the box receiving member 115 and is prevented from slipping out of engagement therewith by means of a set collar 131.

As shown in FIG. 7, a connecting member 132 of said rocking box 129 is slidably inserted in said fork portion 106 to form the universal coupling 108. One end of a rocking member 133 is rotatably connected to a needle bar pipe rocking arm 135 by a pivot connection 134. To the other end of rocking member 133 a sliding member 136 is rotatably attached by a set screw 95.

The rocking box 129 is provided with an arc shaped groove 137 which forms an arc around the pivot connection 134 so that the sliding member 136, which pivots about screw 95, may easily slide within said groove.

A needle bar 140 is supported in usual manner in a needle bar supporting pipe 139, which is pivotally attached to the arm 1 by means of a pivot shaft 138.

In this case, projecting stop portions 142, 143 are provided on both ends of said arc shaped groove 137 to limit the movement of sliding member 136 within the groove. The stops 142 and 143 are located so that the center of sliding member 136 will move between the center of supporting shaft 130 and the center of said connecting member 132 of the rocking box 129. Thus, the movement of the sliding member 136 is confined to these extremes. A guide pin 144 is attached to rocking member 133 to extend into the fork portion 147 formed on one end of a double armed fork lever 146. The lever 146 is pivotally attached to the arm 1 by means of a screw 96 (FIGS. 6 and 7).

The said double armed fork lever 146 is pivotally attached to an end portion of a tension rod 148 of the stitch width adjusting device, and the opposite end of said tension rod 148 is pivotally attached to a grip 150 of the stitch width adjusting device, as by a screw projection 149 and a nut 152 which forms the link connection. The grip 150 is pivotally attached to the arm 1 by means of a screw 151 (FIGS. 6, 7).

The mechanism according to this invention is constructed as mentioned above and its operation and function will be explained with reference to the accompanying drawings as follows.

When this machine is used in usual manner as a zigzag sewing machine, a stitch pattern may be optionally selected by pushing one or more of the push buttons 52, these being stitch pattern selecting members. The slant portion 54 of the push button 52 acts on the slant side edge projection 53 of the vibrator 25 to lift the latter, as previously described, the vibrator 25 pivoting about the fulcrum provided by the set screws 98, 99 in the base block 55 (FIG. 9a). At substantially the same time, the projecting portion 87 of the acting member 88, which is attached to the pushing rod 86 of the push button 52, acts on the fin 44 of the spider 43 to cause its clockwise rotation (FIG. 9b) which, in turn, causes the nose shaped projection 102 to push up the locking bar 103 against the upward bias of push springs 80, 81, as shown. Thus, the locking bar 103 of the snap lever 33 is brought into engagement with the locking recess 42 of the spider 43 and locking of the spider in operating engagement with its associated cam 7 has been effected (FIG. 9c) (FIG. 9d), the bias of spring 46 maintaining the locked condition.

The pin 92 attached to the pushing rod is urged by the spring 93 into engagement with the arc shaped side 105 of the fin 44 when the spider 43 is in vertical position, and will ride on this surface during vibratory movements of the spider, as previously described, and push button 52 will remain sunk from unoperated position. This provides an indication as to which of the cams 7 has been selected and is therefore in operation (FIG. 9d).

It will be noted in connection with the above described action that, upon release of the push button 52 it will be partially withdrawn from its fully pressed condition under the action of the compression spring 93 so that the slant portion 54 will be disengaged from under the projection 53, thereby permitting the vibrator 25 to be restored to its original position by the biasing action of spring 29, but that the contact fin 44 will remain in contact with the cam 7.

When the cam group 7 is rotated by rotation of the upper shaft 10 through operatively connected gears (not shown), the vibrator 25 will rock up and down around the central axis provided by the set screws 98, 99 in the push button base block 55. The compression spring 29 biases the vibrator, and hence the spiders 43, towards the revolving cams 7, thus effecting the vibrating action to cause the machine to produce a stitch pattern as determined by the configuration of the cams 7. Transmission of the vibrator motion to the needle bar 140 is effected by the action of universal coupling 108 upon the rocking box 129. As previously described, the shaft supporting block 110 is attached in fixed position on the arm 1, the box receiving member 115 being mounted on the shaft 117 which, for present purpose of description, may be regarded as stationary. Thus, the supporting shaft 130 (FIG. 6) provides a fulcrum about which the rocking box 129 may rock in response to up and down motion of the connecting member 132 transmitted thereto, by universal coupling 108, from the vibrator 25.

As will be understood from FIG. 7, the bearing member 49 moves with the vibrator 25, being attached thereto, transmitting this motion to connecting member 132 through the fork portion 106 of the freely rotatable shaft 107.

Further modification of the stitch pattern effected by engagement of any or all of the cams 7 may be brought about by adjustment of the stitch width adjusting device by manual rotation of the grip 150. For example, when the grip 150 is turned in clockwise direction (FIG. 7), the center of sliding member 136 will be moved nearer to the central axis of connecting member 132. Rocking motion of the rocking arm 135 will then become more amplified. Moreover, when said central position of sliding member 136 coincides with the central axis of the connecting member 132, the sliding member 136 will be against the projecting stop 143 and the movement of the needle bar pipe rocking arm 135 around the center of the needle bar pipe pivot 138 becomes maximum, so that the rocking width of the needle bar 140 also becomes maximum, and a maximum width of stitch is obtained.

When the grip 150 of the stitch width adjusting device is turned in counter clockwise direction the central position of the sliding member 136 is moved nearer the central axis line of the supporting shaft 130 and the rocking width of the needle bar 140 becomes smaller. When said central position of sliding member 136 coincides with said central axis line of supporting shaft 130, the sliding member 136 will be against the projecting stop 142, all rocking motion of needle bar 140 will cease, and the width of stitch is zero.

Thus, it is seen that additional adjustment to the stitch width, and consequently to the stitch pattern, may be effected by operating the grip 150 of the stitch width adjusting device. The grip 150 may be rotated at any time while the machine remains in motion to impart any desired amount of rocking width to the needle bar 140, and thus any desired stitch width.

When the pattern of the stitch is desired to be changed, another push button 52 may be pushed to cause engagement of its associated cam and spider, as aforesaid. The nose shaped projection 102 of its spider 43 pushes up the locking bar 103, whereupon any spider 43 which is then in engagement will be released by the action of its tension spring 46 when the locking bar is lifted out of its locking recess. The spider which has been engaged will be rotated in counterclockwise direction (FIG. 9) to come to rest against the side 48 of the rectangular set hole 47 in the vibrator 25 and its vibratory motion will be stopped.

When a plurality of push buttons are pushed simultaneously, the above described engaging action will take place with respect to each push button, and a stitch pattern representing the combined effect of all of the engaged cams may be obtained.

As previously mentioned, various stitch patterns will be obtained depending upon the configurations of the cams 7 each of which may be engaged either separately or together with other cams while the machine is in motion to change the stitch pattern as the sewing operation progresses, if desired. Of course, an operator's guide book would be provided showing the various stitch patterns which may be produced by engagement of one or more push buttons, adjustment to the stitch width, or by shifting of the stitch as will now be described.

It should first be mentioned, however, that when it is desired to eliminate the stitch pattern and return to standard stitching, the grip 156 of the standard stitch resuming lever 78 will be pushed down, whereupon the pivoted lever 78 will push up the snap lever 33 so that the locking bar 103 is lifted out of the locking recess 42 of any spider 43 which is at that time engaged. The spider and the cams will become disengaged, as aforesaid, and thus the movement of the vibrator 25 will be stopped, whereupon usual standard stitching will obtain.

The entire stitch pattern may be shifted, thereby to itself introduce a further pattern variation, by shifting the stitching position restricting grip 126 to the right or left. The double armed lever 127 will pivot about the connection 125 and, through the link connection provided by the tension rod 124 and the stitching position restricting single armed lever 121, the shaft 117 and therefore the sliding member 115 will be correspondingly rotated. The spring 116 exerts biasing pressure against the sliding member 115, urging it into pressure engagement with the projection 114 of the shaft supporting block 110, so that its rotatably shifted position, as obtained by movement of grip 126, will be maintained.

When a stitch pattern is produced by operating a push button 52 and the grip 150 of the stitch width adjusting device as aforesaid, the entire pattern may be thus shifted to the right or left. Moreover, if the grip 150 is turned in counterclockwise direction to stop the stitch width rocking motion, and the stitching position restricting grip 126 is shifted to the left, the supporting shaft 130 of the rocking box 129 will be shifted downwards causing the needle bar 140 to be shifted to the left through the rocking member 133. When said grip 126 is shifted to the right, the needle bar 140 will be shifted to the right, and when said grip 126 is located at the central position, the needle bar 140 will be located at the central position. Similarly, were the grip 150 rotated fully to the clockwise position, maximum rocking width in a shifted pattern may be obtained by movement of the restricting grip 126 to the right or left.

In short, according to this invention, whether or not the sewing machine is in motion or at a standstill, by mere operation of any push button, or of the stitch width adjusting device, or of the stitch shifting mechanism, or all of them in a variety of possible combinations, any stitch pattern may be optionally selected. Moreover, by simultaneous operation of a plurality of push buttons, many additional and combined stitch patterns may be obtained. Thus, by the present invention, the latitude of possible variations in stitch patterns will be greatly increased, and introduction of any variation will be efficiently produced without need for the changing of cams, gears or the like, or the need for stopping the machine for any similar adjustment.

What is claimed is:

1. In a zigzag sewing machine including a needle bar mounted for rocking movement, control means for determining a stitch pattern to be produced thereby comprising cam means attached on a rotatable shaft, a movably mounted vibrator element including cam-follower means mounted thereon for movement into cam-following engagement with said cam means whereby rotation of the cam means imparts a pattern of vibratory movement to the vibrator element, means interconnecting said vibrator element and said needle bar to transmit said vibratory movement of the former to the latter to impart said rocking movement thereto, a snap lever movably mounted on said vibrator element for locking engagement with said cam follower means when in said cam engagement position, and push button means mounted for movement into engagement with said cam-follower means to move the latter into said cam engagement position, said push button means when initially so moved also moving into engagement with said vibrator element to move the same relative to said cam means to facilitate said cam following engagement of the cam follower means.

2. In a zigzag sewing machine including a needle bar mounted for rocking movement, control means for determining a stitch pattern to be produced thereby comprising a plurality of cams attached on a rotatable shaft, a movably mounted vibrator element including a plurality of cam followers each mounted thereon for movement into cam-following engagement with one of said cams whereby rotation of the cam imparts a pattern of vibratory movement to the vibrator element, means biasing each said cam follower against its said movement into cam following engagement with its associated cam, means interconnecting said vibrator element and said needle bar to transmit said vibratory movement of the former to the latter to impart said rocking movement thereto, snap lever means movably mounted on said vibrator element for locking engagement with any of said cam followers when in its said cam engagement position, push button means mounted for movement into engagemet with each of said cam followers and actuatable for selectively moving any of the cam followers into their said cam engagement positions contemporaneously with such movement of any other of said cam followers for varying the pattern of vibratory movement which is provided by cam engagement of any of said cam followers, said push button means when initially so actuated also moving into engagement with said vibrator element to move the same relative to all of said cams to facilitate said locking engagement of the snap lever means with the cam follower with which said push button means is associated and to facilitate release from said locking engagement of any of said cam followers then in its said cam engagement position but whose associated push button is not similarly actuated, whereby more than one said cam follower may be locked in their said cam engagement positions simultaneously.

3. In a zigzag sewing machine including a needle bar mounted for rocking movement in a substantially vertical plane, control means for determining a stitch pattern to be produced thereby comprising a rotatable shaft disposed horizontally and in a plane substantially parallel to said vertical plane of movement of the needle bar, cam means attached on said rotatable shaft, a vibrator element mounted for substantially vertical reciprocating movement toward and away from said rotatable shaft, cam follower means mounted on said vibrator element for engagement with said cam means whereby rotation of the rotatable shaft imparts a pattern of vibratory movement to the vibrator element, and means interconnecting said vibrator element and said needle bar to transmit said vibratory movement of the former to the latter to impart said rocking movement thereto, said interconnecting means including a rocking box mounted for pivotal movement about one of its ends, a rocking member connected at one of its ends to said rocking box and at the other of its ends to said needle bar, and universal joint connection means between said vibrator element and the other end of said rocking box, said universal joint connection means comprising horizontally disposed bearing means of said vibrator element oriented at right angles to the plane of direction of said reciprocating movement of the vibrator element, shaft means pivotably received in said vibrator element bearing means and having a slide type coupling at one end thereof, and a shaft attached to said other end of the rocking box and slidably engaging said slide type coupling, said rocking box shaft being oriented at substantially a right angle to said vibrator element shaft means.

4. In a zigzag sewing machine including a needle bar mounted for rocking movement in a substantially vertical plane, control means for determining a stitch pattern to be produced thereby comprising a horizontally disposed rotatable shaft, cam means attached on said rotatable shaft, a vibrator element mounted for substantially vertical reciprocating movement toward and away from said rotatable shaft, cam follower means mounted on said vibrator element for engagement with said cam means whereby rotation of the rotatable shaft imparts a pattern of vibratory movement to the vibrator element, and means interconnecting said vibrator element and said needle bar to transmit said vibratory movement of the former to the latter to impart said rocking movement thereto, said interconnecting means comprising a rocking box receiving member pivotally mounted at one of its ends for arcuate positioning thereof, a rocking box having an end mounted for pivotal movement on the other end of said rocking box receiving member, a rocking member connected at one of its ends to said rocking box and at the other of its ends to said needle bar, universal joint connection means between said vibrator element and the other end of said rocking box, and means to shift and hold the arcuate position of said receiving member, whereby the location of said rocking movement is shifted with respect to the workpiece platform of said machine.

5. In a zigzag sewing machine, control means according to claim 4 wherein said one end of the rocking member is selectively positionable along the length of said rocking box and said other end of the rocking member is pivotally connected to said needle bar, and said control means further includes means for selectively positioning said one end of the rocking member along the length of said rocking box to regulate the sweep amplitude of said needle bar rocking movement, said selective positioning means comprising a lever mounted for pivotal movement in fixed position at one of its ends and having a slide type coupling at the other of its ends, a pin attached to said rocking member centrally of its length, said slide type coupling of said lever slidably engaging said pin of the rocking member, and means pivotally connected centrally along the length of said lever for pivoting the latter about its said one end.

6. In a zigzag sewing machine including a needle bar mounted for rocking movement, control means according to claim 4, wherein said one end of the rocking box receiving member is attached on a shaft which protrudes therefrom in direction perpendicular to the plane in which said arcuate positioning thereof is effected, bearing means for one end of said shaft located remote from one side of said receiving member, bearing means for the other end of said shaft located substantially adjacent the other side of said receiving member, and spring bias means between the first said bearing means and said one side of the receiving member for biasing said other side of the receiving member into frictional engagement at the second said bearing means, whereby said holding of an arcuate position of said receiving member is effected.

7. In a zigzag sewing machine including a needle bar mounted for rocking movement, control means for determining a stitch pattern to be produced thereby comprising a plurality of cams attached on a rotatable shaft, a vibrator element mounted for displaceable movement toward and away from said rotatable shaft and carrying shaft means in parallel spaced relation to said rotatable shaft, a plurality of cam followers each associated with one of said cams and each mounted for independent pivotal movement on said vibrator element shaft means, a push button associated with each said cam follower and mounted for movement into engagement with such cam follower to pivot the same toward engagement with its associated cam, interconnection means between each of said push buttons and said vibrator element whereby actuation of any said push button to so pivot its associated cam follower also displaces said vibrator element in direction away from said rotatable shaft thereby permitting cam following engagement of the cam follower with its associated cam, means retaining such cam following engagement of any of said cam followers with its associated cam, and means interconnecting said vibrator element and said needle bar, whereby when one or more of said cam followers is in such cam following engagement the rotation of said rotatable shaft imparts a pattern of vibratory movement to said vibrator element and thence to said needle bar to impart said rocking movement to the latter.

8. In a zigzag sewing machine including a needle bar mounted for rocking movement, control means according to claim 7 wherein said means retaining such cam following engagement of any of said cam followers with its associated cam comprises snap lever means movably mounted on said vibrator element for locking engagement with each said cam follower when in said cam following engagement with its associated cam, each said cam follower being adapted for engagement with said snap lever means, and means urging said vibrator element in the direction of its displaceable movement toward said rotatable shaft.

9. In a zigzag sewing machine including a needle bar mounted for rocking movement, control means according to claim 8 wherein said snap lever means comprises a single bar in parallel spaced relation to said vibrator element shaft means and engageable with any of said cam followers when in its said cam following engagement with its associated cam, means mounting said single bar on said vibrator element for displaceable movement toward and away from said vibrator element shaft means, and means normally urging said single bar in the direction of its displaceable movement toward said vibrator element shaft means.

10. In a zigzag sewing machine including a needle bar mounted for rocking movement, control means according to claim 7 wherein said means interconnecting said vibrator element and said needle bar comprises a rocking box mounted for pivotal movement about one of its ends, a rocking member connected at one of its ends to said rocking box and at the other of its ends to said needle bar, and universal joint connection means between said vibrator element and the other end of said rocking box.

11. In a zigzag sewing machine including a needle bar mounted for rocking movement, control means according to claim 2 wherein each said cam follower comprises a lever pivotable about an axis centrally of its length thereby providing an upper arm portion and a lower arm portion, said upper arm portion being adapted to receive said snap lever means in said engagement therewith, said lower arm portion being adapted for engaging the cam with which such cam follower is associated, and said push button means comprises a plurality of slidable push button elements each being associated with one of said cam followers, each said slidable element having attached means for pressure engagement with one edge portion of said lower arm portion of its associated cam follower to pivot said cam follower into engagement with its said associated cam when such push button element is so actuated, and second attached means for pressure engagement with another edge portion of said lower arm portion when said snap lever means is so engaged with said upper arm portion of such cam follower, and spring means normally urging each said slidable push button element against such actuating movement, said first and second attached means being spaced apart to permit limited return movement of such push button element in response to the bias of said spring means upon such push button element having been so actuated whereby such push button element is moved out of engagement with said vibrator element and said push button element remains substantially in such actuated position when its associated cam follower is in said engagement with its associated cam, and means for relieving said engagement of the snap lever means with said upper arm portion of such cam follower to permit such cam follower to pivot in response to the bias of said means biasing it against its movement into its said cam following engagement and further to permit such push button element to fully return to its initial pre-actuated position.

References Cited in the file of this patent

UNITED STATES PATENTS

| | | |
|---|---|---|
| 2,810,360 | Perla | Oct. 22, 1957 |
| 2,857,781 | Williams | Oct. 28, 1958 |
| 2,877,726 | Gegauf | Mar. 17, 1959 |
| 2,906,219 | Vigorelli | Sept. 29, 1959 |
| 2,972,319 | Moro | Feb. 21, 1961 |
| 3,031,988 | Armbruster | May 1, 1962 |

FOREIGN PATENTS

| | | |
|---|---|---|
| 1,139,759 | France | Feb. 18, 1957 |
| 329,688 | Switzerland | June 30, 1958 |